United States Patent [19]

DuRocher

[11] 3,947,959

[45] Apr. 6, 1976

[54] METHOD OF MAKING AN ELECTRICAL CONNECTOR

[75] Inventor: Gideon A. DuRocher, Mt. Clemens, Mich.

[73] Assignee: Essex International, Inc., Fort Wayne, Ind.

[22] Filed: Dec. 3, 1973

[21] Appl. No.: 420,980

[52] U.S. Cl. .............. 29/629; 29/630 R; 339/218 R; 339/DIG. 3

[51] Int. Cl.² .......................................... H02G 15/00

[58] Field of Search ......... 339/DIG. 3, 218; 29/629, 29/628, 630 R, 630 A; 264/272, 249, 262, 261; 425/466, 467

[56] References Cited

UNITED STATES PATENTS

| | | | |
|---|---|---|---|
| 2,379,942 | 7/1945 | Webber | 339/DIG. 3 |
| 2,596,420 | 5/1952 | McGarvey | 339/DIG. 3 |
| 2,762,025 | 9/1956 | Melcher | 339/DIG. 3 |
| 3,322,885 | 5/1967 | May et al. | 339/DIG. 3 |
| 3,652,758 | 3/1972 | Pierre | 264/249 |
| 3,685,006 | 8/1972 | Jones | 339/177 R |
| 3,760,342 | 9/1973 | Prouty et al. | 339/272 R |

OTHER PUBLICATIONS

Webster's New World Dictionary, Second College Edition, p. 347, 1972.

*Primary Examiner*—C. W. Lanham
*Assistant Examiner*—James R. Duzan
*Attorney, Agent, or Firm*—Learman & McCulloch

[57] ABSTRACT

A sleeve-type electrical connector comprises a tubular conductor having a socket closed at one end and open at the other end and containing an elastomeric conductive body bonded in the socket adjacent its closed end and adapted to receive one end of a pin terminal. In the manufacture of the connector an excess of uncured, conductive elastomer is introduced to the socket and is subjected to compressive force sufficient to compact the elastomer and extrude the excess through an opening in the socket. The elastomer is cured in situ while subjected to compressive force.

10 Claims, 6 Drawing Figures

METHOD OF MAKING AN ELECTRICAL CONNECTOR

The invention disclosed herein relates to an electrical connector and a method of its manufacture, and more particularly to a sleeve connector that is adapted to receive and cooperate with a pin terminal.

Sleeve connectors are in wide usage in the electrical connector art and are cooperable with pin terminals so as to establish electrical continuity between circuit components. Pin and sleeve connectors have many disadvantageous characteristics. For example, tolerances of the pin and sleeve must be controlled quite rigidly so that a pin may be accommodated in its associated sleeve with sufficient engagement between the pin and the sleeve to provide an electrically conductive path therebetween. In most constructions the dimensional differences between the pin and the sleeve make it difficult for the pin to have more than three points of contact with the sleeve, thereby establishing high density current paths at those points with consequent high heat generation. The electrical conductivity between a pin and its associated sleeve has been improved by coating the pin and the sleeve with a precious metal, such as gold, but the costs of gold and the attendant coating process are exorbitant.

Another disadvantage of conventional pin and sleeve connectors is the difficulty in assembling simultaneously a number of pins in a corresponding number of sleeves. The small differences in diameter of the pins and sleeves requires that the alignment of sleeves and pins mounted in connector blocks be virtually perfect in order that the pins will be introduced to their respective sleeves as the connector blocks are moved toward one another. It is virtually impossible, however, to establish and maintain such alignment, particularly in those instances in which the pins and sleeves must be subjected to repeated coupling and uncoupling.

A further disadvantage of known pin and sleeve connectors, and particularly those having precious metal coatings, is that the assembly of a coated pin in a coated sleeve wipes off the coating. The electrical characteristics of the couplings thus become variable. Such a result severely limits the number of times that such pins and sleeves may be coupled and recoupled.

An object of this invention is to provide an electrical connector of the pin and sleeve type which overcomes the disadvantages referred to above.

Another object of the invention is to provide a sleeve connector having a socket the diameter of which may be considerably larger than that of an associated pin adapted for accommodation in such socket, and which contains a body of conductive elastomer which is capable of establishing an excellent conductive interface between the sleeve and its associated pin.

A further object of this invention is to provide an improved method of producing such sleeve connectors.

Other objects and advantages of the invention will be pointed out specifically or will become apparent from the following description when it is considered in conjunction with the appended claims and the accompanying drawings, in which:

Figure 1:
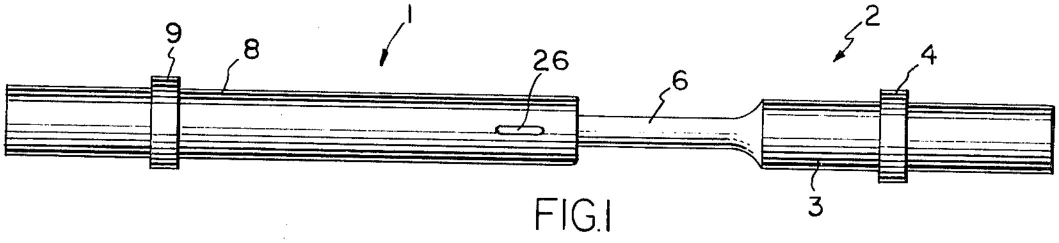
FIG. 1 is an elevational view illustrating an assembled pin and sleeve assembly.
Figure 2:
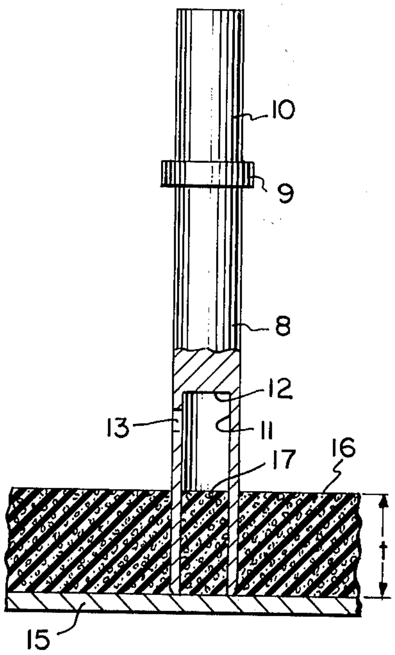
FIG. 2 is an elevational view, partly in section, illustrating one step in the production of a sleeve connector according to the invention.

A sleeve connector of the kind with which the invention is concerned is designated generally by the reference character 1 and is adapted to cooperate with a pin terminal 2 having a cylindrical body 3, formed of brass or the like, encircled by a collar 4 and terminating at one end in an open socket or recess 5 that is adapted to be crimped to one end of an electrical conductor (not shown). From the other end of the body 3 extends an elongate pin or shank 6 of preferably solid material and terminating in a tapered free end 7. The collar 4 is adapted to fix the pin body in a molded connector block (not shown).

The sleeve 1 is formed by a conventional casting or other process from electrically conductive material such as brass and has a cylindrical body 8 provided with a collar 9 and terminating at one end in a recess or socket 10 that is adapted to receive and be crimped to an electrical conductor (not shown). The collar 9 is adapted to fix the body in a molded connector block (not shown). At the other end of the body 8 is a bore or socket 11 that is open at one end and closed at the other by a flat base or wall 12. Adjacent, but spaced from the base 12, is a radial opening 13 which communicates with the socket.

The construction of the sleeve 1 is such that the diameter of the socket 11 is substantially greater than that of the pin shank 6, thereby facilitating the introduction of the pin to the socket and making less critical the prealignment of the axes of the pin and socket. In practice, the diameter of the socket may be as much as about 1.5 times the diameter of the shank 6, thereby greatly facilitating insertion of the shank in the socket.

Accommodated in the socket 11 is an electrically conductive body 14 engageable by the shank 6 so as to establish electrical conductivity between the members 1 and 2. The body 14 preferably comprises a resiliently deformable elastomer throughout which is dispersed a large quantity of discrete, electrically conductive particles. The elastomer preferably comprises a nonconductive, silicone resin containing a bonding catalyst and between 80–9390, by weight, of silver-coated copper spheres having a diameter between 3 and 8 mils. One suitable silicone resin is that designated 4404 by General Electric Company, and a suitable catalyst is VAROX manufactured by R.T. Vanderbilt Chemical Co. Other resins and catalysts may be used, however.

A preferred method of fitting the body 14 into the socket 11 is to mix a quantity of resin, catalyst, and conductive particles in a container 15 to form a homogeneous, uncured layer 16 having a thickness *t* greater than the overall length of the body 14 to be produced. The open end of the sleeve body 8 then may be plunged through the layer 16 so as partially to fill the socket 11 with a cylinder or core 17 of the uncured elastomeric mixture. A molding tool 18 then is used to seat the core 17 against the base 12 of the socket and to shape the core to form the body 14.

The molding tool 18 comprises a cylindrical shank 19 having a diameter corresponding closely to the diameter of the socket 11 and terminating at one end in an enlarged head 20. The opposite end of the shank 19 has an annular shoulder 21 from which extends a frusto-conically tapered stem 22.

Upon introduction of the stem 22 to the open end of the socket 11 containing the core 17, the latter is provided with a correspondingly tapered recess 23 and is pushed bodily toward the base 12. Air in the socket 11 is exhausted through the opening 13 as the core 17 is pushed into the socket.

As has been pointed out, the length of the core 17 is greater than the desired length of the body 14 to be formed. The core, therefore, constitutes an excess of elastomeric material. The combined length of the shank 19 and the stem 22 of the molding tool 18 is such that, when the head 20 bears against the open end of the sleeve body 8, the distance between the base 12 and the shoulder 21 corresponds to the desired length of the body 14 that is to be formed. Since the initial length of the core 17 is greater than the length of the body to be formed, the core 17 is subjected to axially compressive force between the socket base 12 and the shoulder 21. The opening 13 is spaced from the base 12 less than the length of the core 17. Consequently, compression of the core causes the excess thereof to be extruded through the opening 13 in the form of a bead 24, and also compacts the remaining portion of the core to such an extent that a large number of the conductive particles move into engagement with one another and render the elastomer electrically conductive.

Figure 3:
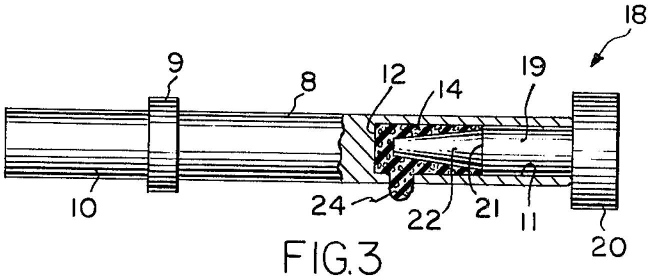
FIG. 3 is an elevational view, partly in section, illustrating a further step in the production of such sleeve connector.
Figure 4:
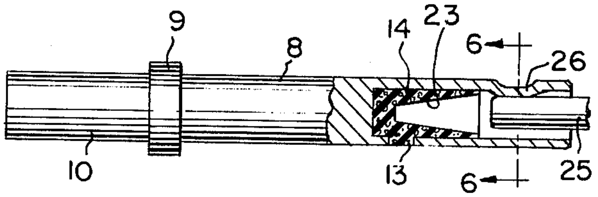
FIG. 4 is a view similar to FIG. 3, but illustrating a still further production step.
Figure 5:
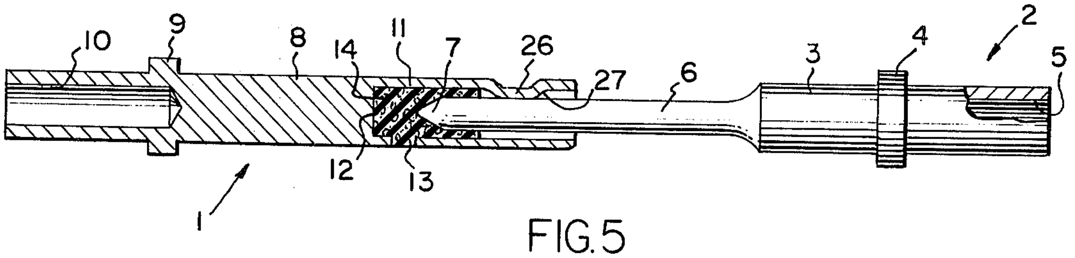
FIG. 5 is a view similar to FIG. 1, but partly in section.
Figure 6:
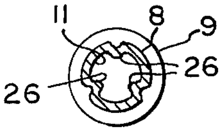
FIG. 6 is a sectional view taken on the line 6—6 of FIG. 4.

While maintaining the molding tool 18 in the position shown in FIG. 3, the connector 1 is placed in a curing oven and the assembly heated at a temperature and for a sufficient period of time to effect curing of the silicone resin and bonding of the latter to the wall and base of the socket 11. Preferably, the shoulder and stem of the molding tool are either formed from material to which the resin will not adhere or are coated with a suitable release agent prior to insertion of the tool 18 into the socket.

Following curing of the resin the tool 18 may be removed from the socket leaving the cured body 14 in the socket with the tapered recess 23 confronting the open end of the socket. The extruded bead 24 may be broken off or cut away.

Following removal of the molding tool 18, a cylindrical mandrel 25 is introduced to the open end of the socket 11. The diameter of the mandrel 25 is less than that of the socket so as to provide an annular clearance around the mandrel. Thereafter, a conventional clinching mechanism (not shown) is fitted over the open end of the sleeve body 8 and is operated to deform the socket wall inwardly at three uniformly spaced apart zones to provide three axially extending guide ribs 26 which lie between the body 14 and the open end of the body 8 and terminate short of the open end. The outwardly facing ends of the ribs 26 are rounded or tapered as at 27.

When a pin terminal 2 is to be fitted into the socket of the sleeve connector 1, the nose 7 of the shank 6 is introduced to the open end of the socket. The tapered ends 27 of the guides 26 will center the shank 6 so that its nose 7 enters the recess 23 of the body 14. As the pin shank is thrust further into the socket 11, the nose 7 will engage the sides of the recess 23. The bluntness of the nose causes it to engage the side wall of the recess 23 and deform the material of the body inwardly of the recess. The nose and the adjacent portion of the shank 6 thus become embedded in the body 14, whereupon the conductive particles contained in the body 14 establish a large number of electrically conductive paths between the members 1 and 2. Embedding of the shank in the body compensates for any dimensional differences between different pins. Since the embedding of the shank 6 in the body 14 compacts the latter, it is not essential that the body be conductive in the absence of the application of an external compressive force.

Since the nose 7 of the shank 6 becomes embedded in the body when the members 1 and 2 are assembled with one another, the members 1 and 2 may be uncoupled and recoupled repeatedly without adversely affecting the electrical conductivity between the members.

I claim:

1. A method of producing an electrical connector comprising forming a conductive, tubular member open at one end and closed at its other end; introducing to said member a body of uncured, elastomeric resin having a plurality of electrically conductive particles dispersed therethrough, said body having a cross-sectional area corresponding to that of said member and a thickness less than that of said member; seating and compacting said body against the closed end of said member; and curing said resin in situ while maintaining said body compacted to form between the ends of said member a resilient, elastomeric, electrically conductive core.

2. A method according to claim 1 including bonding said body to said member.

3. A method according to claim 1 wherein the size of the body introduced to said member is in excess of that required to form said core, and including removing the excess of said body prior to the curing of said resin.

4. A method according to claim 3 wherein said excess of said body is removed by extruding it through a radial opening in said member located between the ends of said member.

5. A method according to claim 1 including forming in said core an axially extending recess facing the open end of said member.

6. A method according to claim 4 wherein said recess tapers in a direction toward said closed end of said member.

7. A method according to claim 1 including deforming said member inwardly adjacent its open end to provide guide means.

8. A method according to claim 6 wherein said member is deformed inwardly at circumferentially spaced intervals.

9. A method of producing an electrical connector comprising forming a conductive, tubular member open at one end and closed at its other end; introducing to said member a body of uncured, elastomeric resin having a plurality of electrically conductive particles dispersed therethrough; seating and compacting said body against the closed end of said member; curing said resin in situ while maintaining said body compacted to form between the ends of said member a resilient, elastomeric, electrically conductive core, the size of the body introduced to said member being in excess of that required to form said core; and removing the excess of said body prior to the curing of the resin.

10. A method according to claim 9 wherein said excess of said body is removed by extruding it through a radial opening in said member located between the ends of said member.

* * * * *

UNITED STATES PATENT AND TRADEMARK OFFICE
CERTIFICATE OF CORRECTION

PATENT NO. : 3,947,959

DATED : April 6, 1976

INVENTOR(S) : Gideon A. DuRocher

It is certified that error appears in the above–identified patent and that said Letters Patent are hereby corrected as shown below:

Column 2, line 50, change "90" to --%--.

Column 4, after line 15 insert:

-- This disclosure is representative of a presently preferred construction and method, but is intended to be illustrative rather than definitive of the invention. The invention is defined in the claims.--

Signed and Sealed this

*eighth* Day of *June 1976*

[SEAL]

*Attest:*

RUTH C. MASON
*Attesting Officer*

C. MARSHALL DANN
*Commissioner of Patents and Trademarks*